United States Patent Office 3,510,809
Patented May 5, 1970

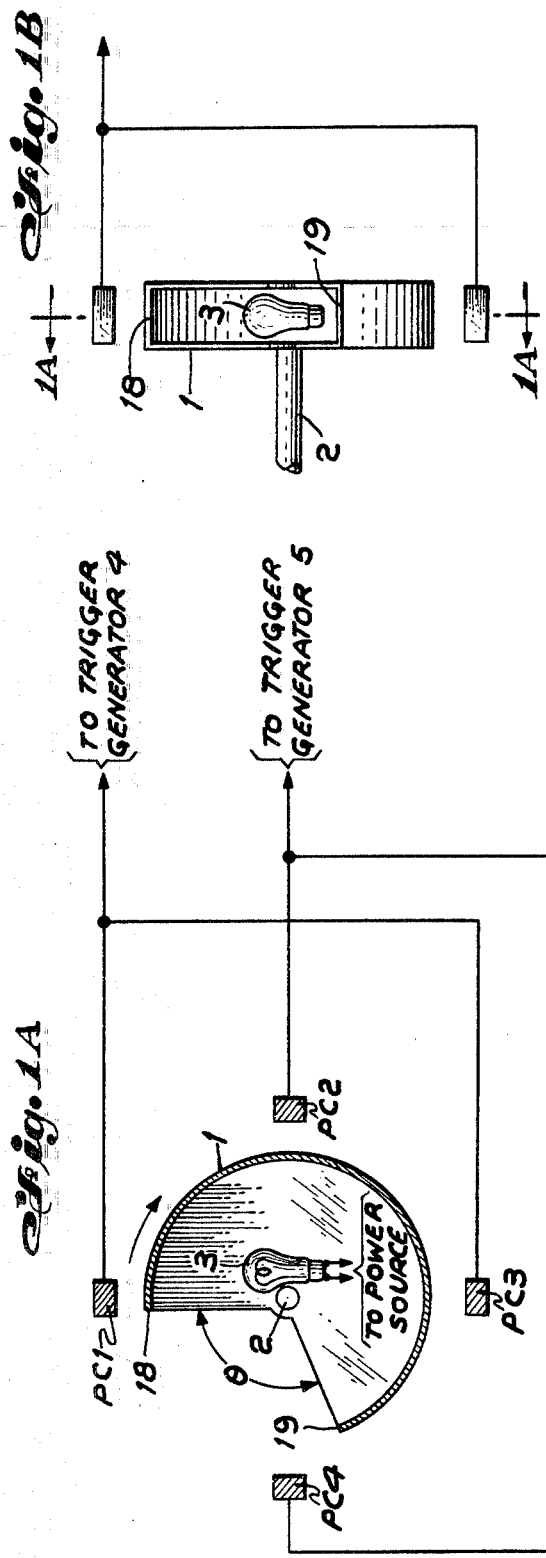
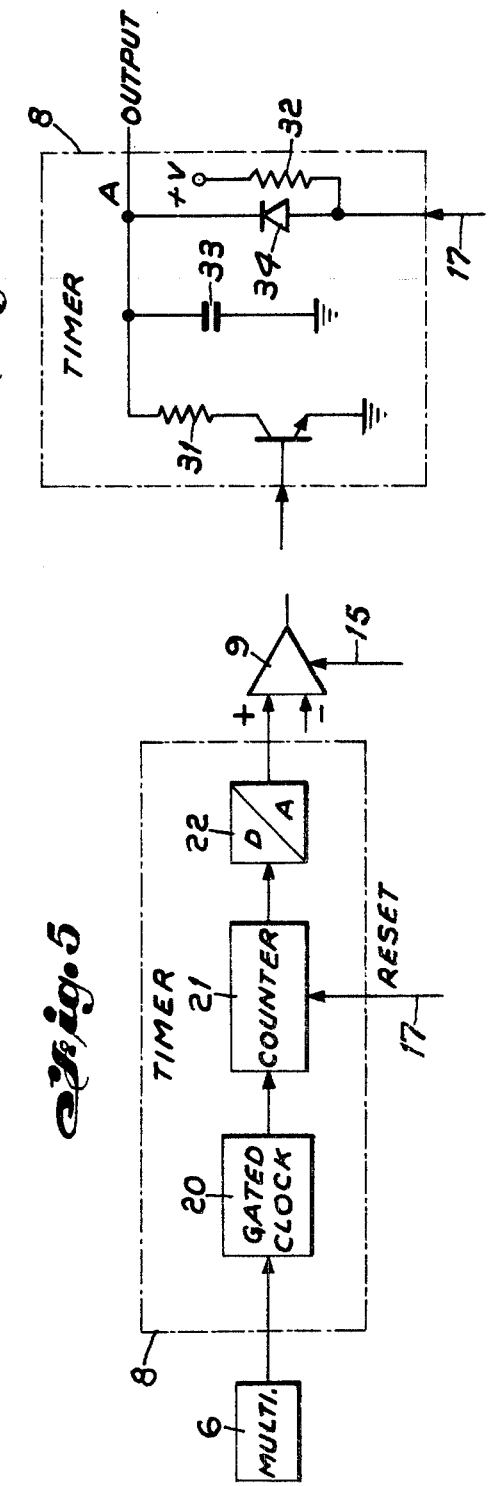

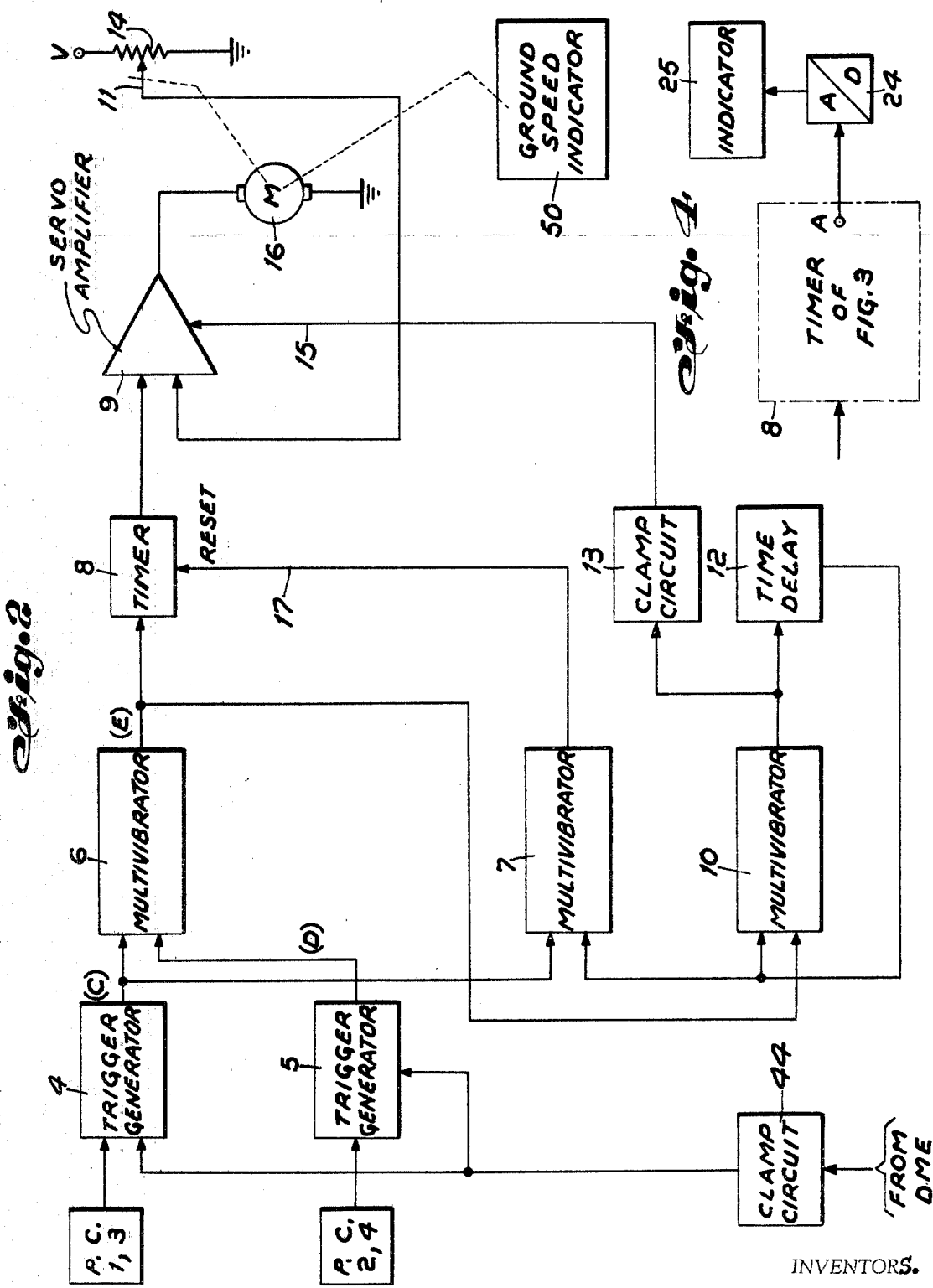

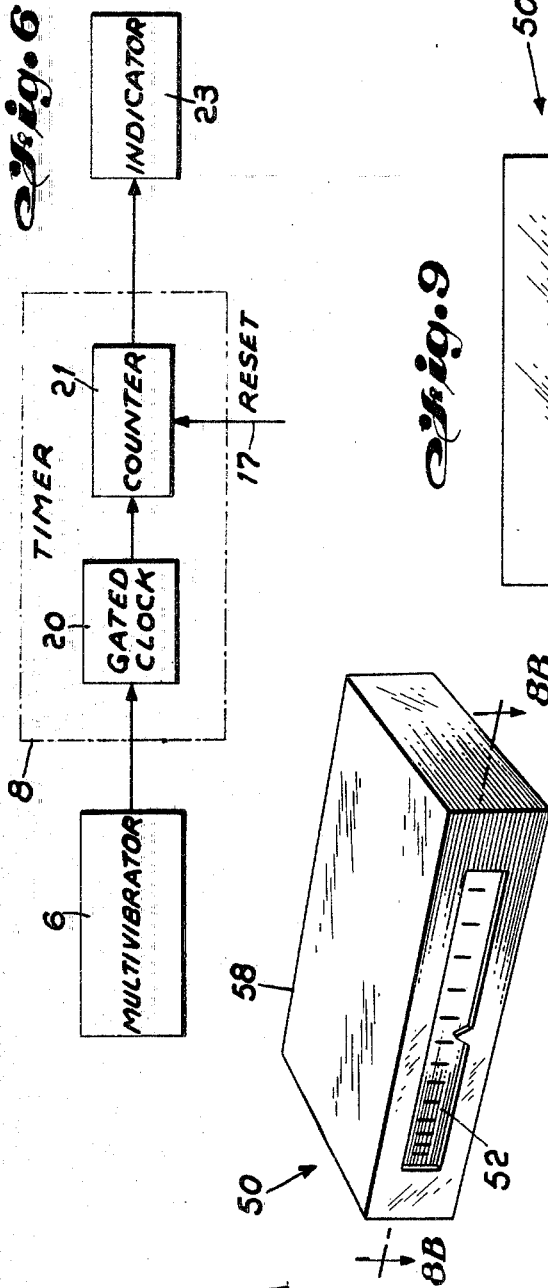
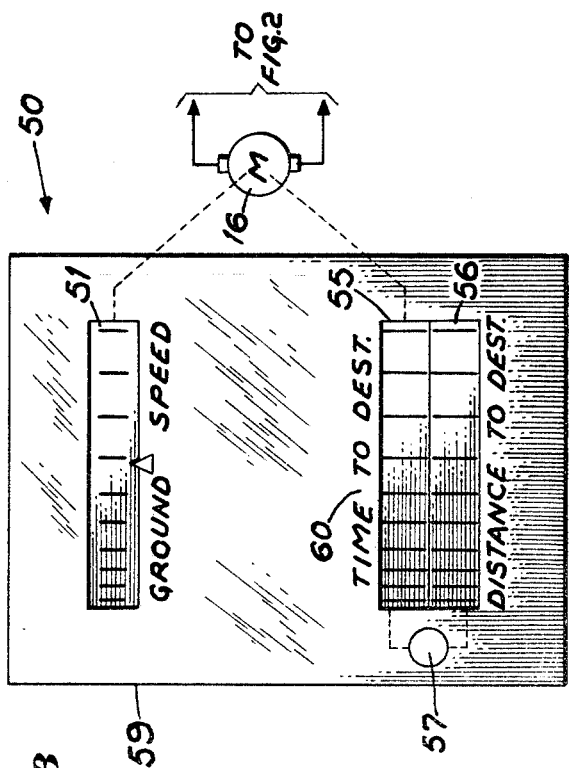
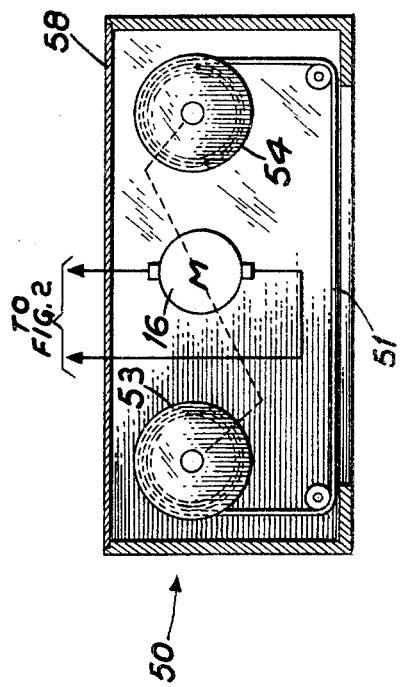

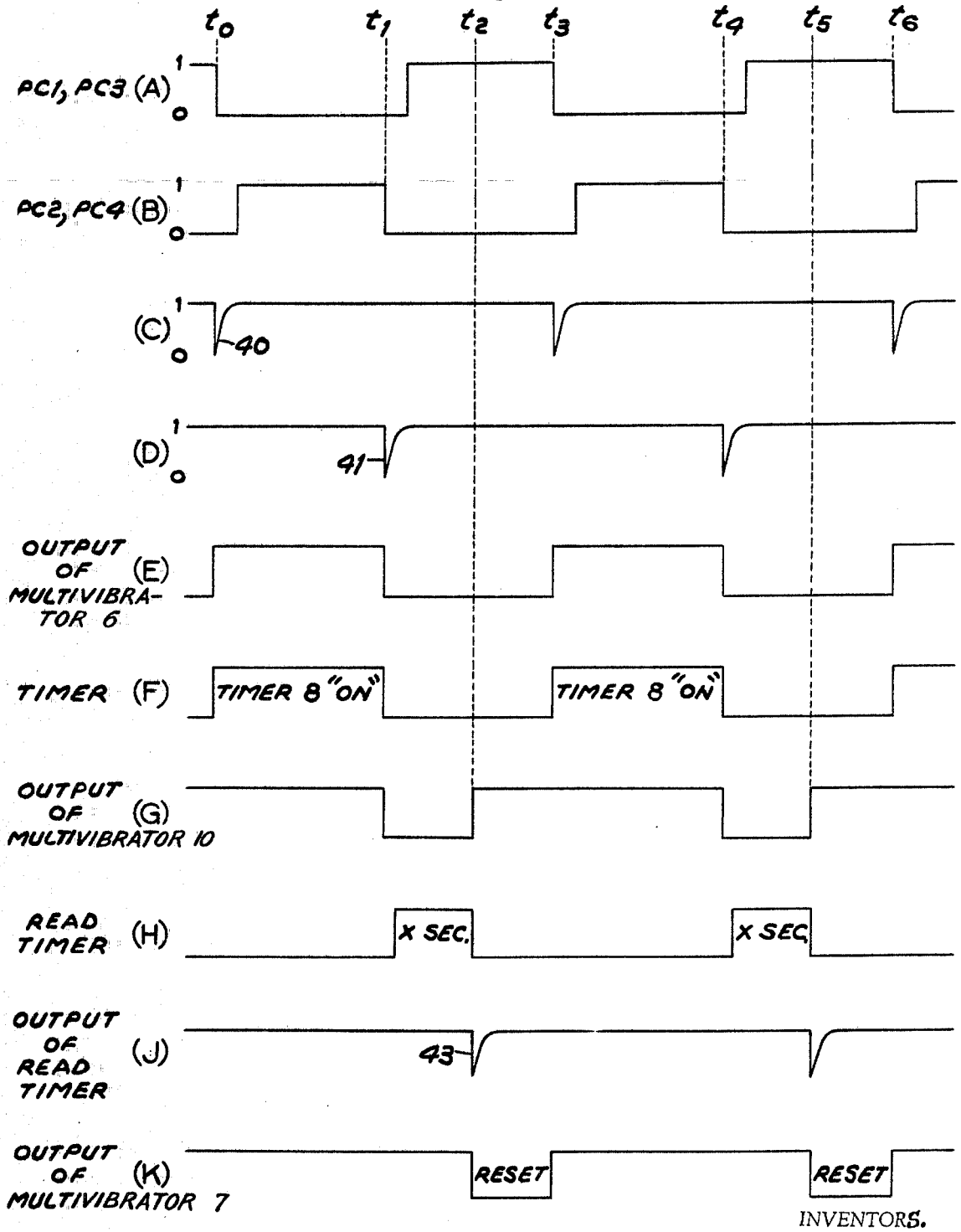

1

3,510,809
VEHICLE VELOCITY INDICATOR
James L. Hudson, Westfield, and Arthur L. Langlieb,
Wayne, N.J., assignors to International Telephone and
Telegraph Corporation, Nutley, N.J., a corporation of
Maryland
Filed May 16, 1967, Ser. No. 638,912
Int. Cl. G01p *3/68;* G01s *9/44*
U.S. Cl. 324—70    3 Claims

ABSTRACT OF THE DISCLOSURE

A vehicle velocity indicator, wherein apparatus is photoelectrically coupled to the rotating drum of an existing DME indicator, thereby applying substantially no mechanical load on the DME indicator drum. The velocity measuring circuitry includes a timer for measuring the time for said drum to rotate by a predetermined amount, said time being a function of vehicle velocity, and a readout device for translating the output of the timer to velocity information.

BACKGROUND OF THE INVENTION—FIELD OF INVENTION

This invention relates to vehicle velocity indicators and more particularly to a vehicle velocity indicator for use with a mechanism which is displaced a predetermined amount per unit distance of vehicle travel.

In many vehicles, such as aircraft and the like, it is desirable to continuously or periodically monitor the speed thereof. Particularly in aircraft, it is desirable to provide an automatic readout of the ground speed rather than the air speed on either a continuous or periodic basis. This relieves the crew of the necessity of making calculations to obtain "true ground speed" and "estimated time of arrival (ETA)" from the normally present air speed indicator. This is particularly important in a two man aircraft where the crew already has a large workload.

Most modern commercial and military aircraft presently contain DME equipment for determining the distance of the aircraft from a particular beacon. A typical example of such a DME is the Model No. 100B interrogator with a Model No. AIN–102A distance indicator, both manufactured by ITT Federal Laboratories, Nutley, N.J. In this particular DME a drum in the indicator is very accurately rotated at the rate of one revolution per 10 miles of vehicle ground travel. In order to reduce the complexity, size and cost of a ground speed indicator, it would be desirable to use as much of the information available from such presently existing DME indicator equipment as possible, and in particular, it would be desirable to make use of the accurately controlled displacement of the drum. But, substantially no mechanical load can be placed on the drum or else errors may be introduced in the DME indicator equimpent itself.

Therefore, the main object of this invention is to provide an improved vehicle velocity indicator for use with a mechanism which is displaced a perdetermined amount per unit distance of vehicle ground travel.

Another object of this invention is to provide such a velocity indicator which applies substantially no mechanical load to said displaceable mechanism.

2

SUMMARY OF THE INVENTION

In accordance with the present inventions, a vehicle velocity indicator comprises light responsive means coupled to a mechanism which is displaced a predetermined amount per unit distance of vehicle travel for producing signals at predetermined points of displacement of said mechanism, the light responsive means applying substantially no mechanical load to the displaceable mechanism. Further included is a timer coupled to the light responsive means for generating a signal proportional to the period of time elapsed between first and second signals produced by the light responsive means, the elapsed time being a function of the velocity of the vehicle. Apparatus is also provided for providing an output proportional to the final state of the timer and for providing an indication of the velocity of the vehicle. Further coupled to the timer is apparatus for resetting the timer after a predetermined period of time has elapsed after said second signal is generated.

BRIEF DESCRIPTION OF THE DRAWINGS

FIG. 1A is a side view of the light responsive apparatus which is secured to the shaft of a rotating drum of a typical DME indicator;

FIG. 1B is a sectional view of the apparatus of FIG. 1A;

FIG. 2 is a block diagram of a preferred embodiment of this invention;

FIG. 3 is a circuit diagram of a typical analog timer for use in the block diagram of FIG. 2;

FIG. 4 is a block diagram of a modified indicator utilizing the timer of FIG. 3;

FIG. 5 is a block diagram of a typical digital timer for use in the block diagram of FIG. 2;

FIG. 6 is a block diagram of a modified digital timer for use with a digital indicator;

FIG. 7 is an illustration of the waveforms appearing at various points in the system of FIGS. 1 and 2;

FIG. 8A is a plan view of a preferred readout device according to this invention;

FIG. 8B is a schematic sectional view of the apparatus of FIG. 8A; and

FIG. 9 is a plan view of the readout device illustrated in FIG. 8 further comprising a means for computing the "time to destination."

DESCRIPTION OF A PREFERRED EMBODIMENT

The following detailed description of a preferred embodiment of this invention will be made with reference to a ground speed indicator for aircraft which is coupled to the rotating drum of a DME indicator such as the AIN–102A DME manufactured by ITT Federal Laboratories, Nutley, N.J. In this particular system, the rotating drum of the DME indicator is accurately rotated at the precise rate of one revolution per ten miles of vehicle ground travel along the DME radial. It is further pointed out that as the vehicle approaches the DME beacon, the rotating indicator drum rotates in one direction and as the vehicle travels away from the DME beacon, the indicator drum rotates in the opposite direction. Therefore, the system described herein must provide bi-directional operation in the determination of vehicle ground speed.

Referring now to FIGS. 1A and 1B, there is shown a cylindrically shaped member 1 secured to the shaft 2 of the rotating drum of an existing DME indicator (not shown). The cylindrical member 1 has a "window" in the side wall thereof through which light may pass. The angle $\theta$ of this window is at least 90°. Mounted within the cylindrical member 1, is a light source 3 which is coupled to a power source (not shown) in a manner well known in the art. Mounted about the periphery of cylindrical member 1 are four photoelectric devices, PC1, PC2, PC3, and PC4. These four photoelectric devices are spaced equidistant about said periphery of cylinder 1. The manner in which photoelectric devices PC1, PC2, PC3, and PC4 are mounted is not shown herein since this is believed to be a matter of engineering design and the details thereof are not deemed necessary for a proper understanding of the instant invention. Referring to FIG. 1A, an arrow is shown to indicate that cylindrical member 1 rotates in a clock wise direction. Photoelectric devices PC1 and PC3 are coupled together and are further coupled to the trigger generator 4 shown in FIG. 2. Photoelectric devices PC2 and PC4 are coupled together and to the trigger generator 5 shown in FIG. 2.

Referring now to FIG. 2, the trigger generator 4 is coupled to one input of multivibrator 6 and to one input of multivibrator 7. The trigger generator 5 is coupled to the other input of multivibrator 6 and the output of multivibrator 6 is coupled to the input of a timer 8 and to one input of multivibrator 10. The output of multivibrator 7 is coupled to the reset input of timer 8 via reset lead 17. The output of timer 8 is coupled to one input of servo amplifier 9, the output of servo amplifier 9 being coupled to a servo motor 16. Servo motor 16 is mechanically coupled to the wiper arm 11 of potentiometer 14, the wiper arm 11 being electrically coupled to the other input of servo amplifier 9 to provide feedback. Further coupled to motor 16 is a read-out indicator 50, the details of which are discussed hereinbelow. One end of potentiometer 14 is coupled to ground potential, the other end of potentiometer 14 being coupled to DC voltage source V.

The output of multivibrator 10 is coupled to a clamping circuit 13 which is further coupled to the clamp input of servo amplifier 9 via lead 15. The output of multivibrator 10 is further coupled to a time delay 12, the output of which is coupled to the other input of multivibrator 10 and to the other input of multivibrator 7. Further coupled to trigger generators 4 and 5 is a clamp circuit 44 which receives a signal from the DME indicator equipment (not shown) when the aircraft is within 20 miles from the ground beacon. The "20 mile indicator" is not present in standard DME indicators but is derived for the purposes of this invention by utilizing techniques well known to those ordinarily skilled in the art. Therefore a more detailed discussion of this apparatus is not included herein. At the 20 mile point, the clamp circuit 44 provides an output signal which renders trigger generators 4 and 5 inoperative. It is recognized however, that the system may be clamped off at distances from the beacon other than 20 miles, depending upon the requirements of the particular system in use.

In this particular embodiment, the photoelectric devices PC1–PC4 are photoresistive elements which have a high impedance in the "dark" state and a low impedance in the "light" state. It should be clear that other types of photoelectric devices may be substituted for photoresistors within the spirit of this invention by one ordinarily skilled in the art.

The operation of the circuit of FIG. 2 in conjunction with mechanism of FIG. 1 will now be described with reference to the waveforms of FIG. 7. When the light emitted from light source 3 is blocked from reaching PC1 by cylindrical member 1 the photoelectric device PC1 is in its high impedance state (or in its "1" state) as shown in FIG. 7A. At the time $t_0$, the leading edge 18 of the window in cylindrical member 1 is in position such that light from source 3 impinges upon PC1. This causes PC1 to go to its low impedance, or "0" state. By virtue of this transition from its high impedance state to its low impedance state, PC1 causes a pulse 40 to be generated by trigger generator 4 as illustrated in FIG. 7C. This pulse 40 sets multivibrator 6 so that a "1" appears at the output thereof (FIG. 7E) and initiates the timing cycle of timer 8 (see FIG. 7F). This has no effect on multivibrator 10 since it is normally in its "1" output condition. During this period of time, the clamp circuit 13 clamps servo amplifier 9 in its off condition so that no error voltage is fed to servo motor 16. The timing cycle of timer 8 continues to run until the time $t_1$ when the leading edge 18 of the window in cylindrical member 1 is in a position so that light from source 3 impinges upon photoelectric device PC2. At this point PC2 makes the transition from its high impedance to low impedance state and thereby causes trigger generator 5 to generate a pulse 41 (see FIGS. 7B and 7D) which resets multivibrator 6 (FIG. 7E) to its "0" output state, thereby turning off timer 8 and ending the timing cycle of timer 8. At this point, $t_1$, when multivibrator 6 is reset, the output thereof is fed to multivibrator 10 which cause multivibrator 10 to be set so that a "0" appears at its output (FIG. 7G). This releases the clamp 13 and enables servo amplifier 9 to operate in its normal mode, i.e., to respond to any difference in potential between its two inputs. At the same time, the output of multivibrator 10 is fed to time delay 12 (read timer) which allows servo amplifier 9 to drive the servo motor 16 (and, therefore, indicator 50) for a predetermined number of seconds.

It is pointed out that the timing circuit 8 is of the type that provides an output voltage which is a function of the time elapsed during which the timing circuit was operative, which voltage is also a function of vehicle ground speed. A more detailed description of two such timing circuits appears hereinbelow.

When the clamp signal from circuit 13 is released at time $t_1$, the servo amplifier 9 receives a feedback voltage via wiper arm 11 of potentiometer 14 which is compared with the output voltage of timer 8. If a difference voltage exists, then a voltage appears at the output of servo amplifier 9 and causes servo motor 16 to be driven in such a direction to cause the voltage appearing at wiper arm 11 to be equal to the voltage appearing at the output of timer 8, which voltage is a function of the ground speed of the aircraft. This type of servo motor feedback circuit is well known in the art and a more detailed discussion thereof is deemed unnecessary for a proper understanding of this invention. During the next cycle of the apparatus of FIGS. 1 and 2, the positions of wiper 11 and of read-out 50 will change if the aircraft ground speed had changed during the interval between cycles.

At the end of the delay period of time delay element 12 (i.e. at time $t_2$), a signal pulse 43 (see FIG. 7J) is fed to the set input of multivibrator 10 which sets multivibrator 10 to its "1" output state and causes memory clamp circuit 13 to again clamp servo amplifier 9 to its inoperative condition. Concurrently, the output of time delay 12 is fed to the reset input of multivibrator 7, the output of which is coupled to timer 8 via lead 17 for resetting timer 8, thereby placing it in condition for the starting of another cycle when light impinges upon photoelectric device PC3.

When PC3 goes to its low impedance state a time $t_3$ the exact same sequence of events described above, is repeated. See FIGURE 7. This is because PC1 and PC3 are coupled together and PC2 and PC4 are coupled together and, therefore, the circuit of FIG. 2 responds exactly the same if either of the above two pairs of photo-sensitive elements provides a signal output.

It is again pointed out that the cylindrical member 1, which is secured to the drum of the DME indicator, rotates accurately at the precise speed of one rotation per ten (10) miles of ground travel in the DME system under discussion. Therefore, for every one quarter revolution thereof the vehicle travels 2.5 miles. Hence, the time during which the timer 8 is on, which corresponds to one quarter revolution of cylindrical member 1, is the time that it takes for the vehicle to travel 2.5 miles with respect to the ground. Since the timer 8 provides an output signal which is a function of the elapsed period of time that it was on, this output is also a function of the ground speed of the vehicle. This output voltage is then fed to null-type servo system comprising amplifier 9, servo motor 16 and potentiometer 14, for providing an indication of the ground speed of the vehicle. The servo motor 16 is coupled to an indicator device 50 for visually displaying said ground speed. A detailed description of an indicator for use with this invention appears below.

Note further that the servo system is clamped to its inoperative state for most of the cycle and that it is only enabled during the time period corresponding to the time delay of delay element (read timer) 12. It has been found in practice that a satisfactory value for the time delay of read timer 12 is five seconds. This provides sufficient time for the servo system to properly "null in" for almost all possible conditions. The time delay of read timer 12 may, however, vary considerably from the value of 5 seconds and still allow proper functioning of the system.

Referring to FIG. 3, there is illustrated a timing circuit for use as the timer 8 of FIG. 2. This circuit is for use with the servo indicator also shown in FIG. 2. This is a standard type of capacitive discharge timer which is well known in the art. The bias arrangements for the transistor are not shown for the sake of simplicity. The base electrode of a transistor 30 is coupled to the output of multivibrator 6 and the emitter electrode of the transistor 30 is coupled to ground potential. The collector electrode of transistor 30 is coupled to a D.C. voltage source V via resistors 31 and 32 and diode 34. Coupled between the junction of resistor 31 and diode 34 (junction A) and ground potential is a precision timing capacitor 33. Reset lead 17 is coupled to the junction diode 34 and resistor 32. The output of timer 8 is also taken from junction A. Capacitor 33, in its initial state, is fully charged to the voltage V. When the timer 8 is enabled by the output of multivibrator 6, transistor 30 is turned on to provide a discharge path for capacitor 33 via precision resistor 31 and the collector-emitter path of transistor 30. Capacitor 33 continues to discharge until the output of multivibrator 6 goes to its "0" state (when PC2 goes to the zero state after ¼ revolution of cylinder 1) and thereby turns off transistor 30. At this point the output voltage of the timer 8 is a function of the charge remaining on capacitor 33 which is a function of the elapsed time for cylinder 1 to rotate ¼ revolution (or for the vehicle to travel 2.5 miles). When reset lead 17 is energized by means of multivibrator 7 after the predetermined time delay of delay element 12, the capacitor 33 is recharged to the voltage V, thereby making it ready for the next timing cycle.

Referring to FIG. 4 there is shown the timer 8 of FIGURE 3 coupled to an analog-to-digital converter 24 which is further coupled to a digital indicator 25 for providing the velocity readout. The digital indicator 25 and A/D converter 24 of FIGURE 3B replace the servo type indicator system of FIGURE 2 which comprises elements 9, 11, 14, 16 and 50. The A/D converter 24 converts the analog output of timer 8 into a digital signal to which indicator 25 responds. Both of these blocks (blocks 24 and 25 of FIGURE 4) are well known in the art and a more detailed description thereof is deemed unnecessary for a proper understanding of the instant invention.

Referring to FIGURE 5 there is shown a digital version of the timer 8 shown in block form in FIGURE 2 which operates with the servo system of FIGURE 2. The output of multivibrator 6 is coupled to a gated clock 20 which is further coupled to a counter 21 for counting the number of clock pulses fed thereto. The output of counter 21 is fed to a digital-to-analog converter 22 which converts the digital count of counter 21 to an analog signal which is a function of the period of time that clock pulses were being fed to counter 21. The output of the digital-to-analog converter is fed to an input of servo amplifier 9. The reset lead 17 is coupled to the reset input of counter 21. The design of elements 20, 21 and 22 are well known in the art and a further description thereof is deemed unnecessary for the purposes of explanation of the instant invention. The operation of this digital timer is as follows. When a "1" output appears at the output of multivibrator 6 responsive to a signal from PC1 or PC3, gated clock 20 is turned on. The clock outputs thereof are counted in counter 21 until the gated clock 20 is turned off by virtue of the output of multivibrator 6 going to "0" responsive to a signal from PC2 or PC4. The output count of counter 21 is therefore a function of the elapsed time for the cylinder 1 to rotate ¼ revolution or for the vehicle to travel 2.5 miles. This output is converted to an analog voltage by means of digital-to-analog converter 22. The analog voltage representing said elapsed time is then fed to servo amplifier 9. When the reset signal appears on lead 17, the counter 21 is reset to its initial condition, thereby rendering the circuit ready for the next cycle.

Referring to FIG. 6 there is shown a digital timer similar to that of FIGURE 5 which is modified for use with a digital indicator 23 instead of the servo-type indicator of FIGURE 2. Like elements in FIGURES 5 and 6 are given the same designation numerals wherever possible. In this embodiment the digital-to-analog converter 22 of FIGURE 5 is omitted and the digital output of counter 21 is fed directly to indicator 23 which interprets the counter output and provides the velocity readout. Again, indicator 23 is of the type well known in the art and, therefore, a more detailed description thereof is not included herein.

As was mentioned hereinabove, clamp circuit 44 (see FIGURE 2) receives a signal from the previously described, modified DME indicator equipment aboard the aircraft when the aircraft is within 20 miles from the ground beacon. The reason for this is that within 20 miles, due to the steep vertical angle of the aircraft from the beacon, erroneous readings will result since the radial distance of the aircraft from the beacon is no longer close enough to the horizontal distance. Therefore, the ground speed indicator is clamped "off" during this period of time and the last ground speed reading before the circuit was clamped off is maintained. When the aircraft is again outside of the 20 mile limit, the clamp from circuit 44 is removed and the ground speed indicator is again made operative.

It is also pointed out that in the DME under consideration, as the aircraft approaches a ground beacon, the drum of the DME indicator rotates in a first direction. As the aircraft passes over the beacon and flies in a direction away from the beacon, the direction of rotation of the drum in the DME indicator reverses. This, of course, reverses the direction of rotation of the cylindrical member 1 illustrated in FIG. 1. Therefore, the ground speed indicator according to this invention must operate in a bi-directional manner. A description of the operation of the subject system when the direction of the rotation of the drum reverses is described below.

Referring to FIG. 7, assume that after time $t_4$ the circuit of FIG. 2 is clamped off by means of clamp circuit 44. It is noted that even though the trigger generators 4 and 5 are now inoperative, the cycle initiated at the time $t_4$ will complete itself and the system will remain ready for the receipt of the next input pulse from the photoelectric circuit of FIGURE 1. As the aircraft flies over the beacon and the direction of rotation of cylindrical member 1 reverses, the other edge 19 of the "window" in cylindrical member 1 will become the leading edge of the window and will cause pulses similar to those of FIGS. 7C and 7D to be generated. Other than the distinction that edge 19 now becomes the leading edge of the window in cylindrical member 1, the system operates in the identical manner as was described above with respect to the normal mode of operation when the aircraft is approaching a beacon. Therefore, a more detailed explanation of the operation of the circuitry when operated in the reverse mode is deemed unnecessary for a proper understanding of the invention.

It is again pointed out that the only mechanical coupling to the rotating drum of the DME is cylindrical member 1 which is adapted to provide substantially no inertial load thereto. All of the signals feeding electronic circuitry of FIG. 2 are generated my means of making and breaking a light beam between a photosensitive element and a light source. Therefore, since the rotating drum of the DME indicator has substantially no inertial load applied thereto, substantially no error will be introduced in the DME equipment itself.

Referring to FIGS. 8A and 8B, there is illustrated in detail two views of a typical ground speed indicator readout device 50 mounted in a housing 58 according to this invention. This device is usable with the system of FIG. 2 utilizing the timers of FIGS. 3 and 5. This readout device includes a Negator spring 51 (FIG. 8B), one face of which has a speed scale 52 printed thereon. Respective ends of spring 51 are wound on reels 53 and 54, reels 53 and 54 being coupled to servo motor 16 in a manner (not shown) well known in the art. The Negator spring 51 has the characteristic that an equal amount of torque is supplied at each reel 53 and 54 independent of how many turns of the spring are on each reel. Therefore, there is a minimum of backlash in the drive system. By virtue of this characteristic of a Negator spring, when the motor drives reel 53 to "take up" the spring 51 thereon, the same amount of torque is required as would have been necessary to "take up" the spring on reel 54. Also, since the tension on each reel 53 and 54 is substantially equal, when the motor 16 is inactive there will be substantially no external forces on the reels which would tend to move them and to cause wiper arm 11 of potentiometer 17 to move to an erroneous position. Note that the outputs of timer 8 and the characteristics of the servo system must be properly calibrated in accordance calibrated in accordance with the scale 51 to provide the correct speed indications.

Referring to FIG. 9 there is illustrated another readout device mounted in a housing 59 according to this invention which also uses a Negator spring 51 as the ground speed readout in the indicator 50. Again, this readout is only usable with the apparatus of FIG. 2 utilizing the timers of FIGS. 3 and 5. In this embodiment the ground speed scale on spring 51 is logarithmic in nature. Mounted below the ground speed indicator spring (or tape) 51 and mechanically coupled thereto is a readout spring (or tape) 55 calibrated in "time to destination." Tape 25 also has a logarithmic scale printed thereon, as does the ground speed indicator spring 51. Located below the "time to destination" indicator 55 is a "distance to destination" indicator spring (or tape) 56, also having a logarithmic scale printed thereon. Indicator 56 is manually operable in this embodiment by means of knob 57 which is coupled thereto and to indicator 55. Note that the readout on indicator spring 51 (vehicle ground speed) is automatically provided by the apparatus of FIGS. 1 and 2 according to this invention, and that the "distance to destination" is known by the crew of the aircraft. Readout tapes 51 and 55 are simultaneously driven by the apparatus of FIGS. 1 and 2 in opposite directions to simulate the operation of a slide rule. The operator now manually sets the indicator tape 56 by means of knob 57 which is coupled thereto by means not shown to indicate the number of miles to destination. This is accomplished by setting the proper number on "distance to destination" indicator 56 to appear anywhere within the window 60. Indicator tape 55, which is coupled to indicator tape 56 will now automatically provide a readout of the "time to destination" in a slide rule type fashion anywhere within window 60. The "time to destination" corresponds to the number on the indicator tape 55 which is aligned with any desired number on distance indicator 56 appearing in window 60. This slide-rule type calculator feature provides a simple method for determining the "time to destination" with a minimum of calculation on the part of the crew of the aircraft. Note that readout tapes 51, 55 and 56 are preferably Negator springs and that for the sake of simplicity, the mechanical details of FIG. 7 are not included herein. Anyone ordinarily skilled in the art is capable of designing such a readout mechanism within the spirit of this invention.

We claim:
1. A vehicle velocity indicator for use with a mechanism which is displaced a predetermined amount per unit distance of vehicle travel with respect to ground comprising:
a source of light;
a plurality of light responsive means adapted to receive light from said source;
means coupled to said mechanism for directing the light from said light source to different ones of said light responsive means at predetermined points of displacement of said mechanism;
timing means for providing an output signal which is a function of the length of time that said timing means is on;
means coupled to one of said light responsive means for turning on said timing means responsive to a first one of said signals;
means coupled to another of said light responsive means for turning off said timing means responsive to a second one of said signals, the period of time during which said timer was on being a function of the velocity of said vehicle with respect to ground;
a vehicle velocity indicator coupled to said timing means; and
means coupled to said timing means for indicating the distance of the vehicle from its destination on a logarithmic scale.

2. Apparatus according to claim 1 further including a logarithmic scale mechanically coupled with said velocity indicator and with said distance-to-destination indicator for displaying the amount of time required to reach a predetermined destination in a slide rule type fashion.

3. A vehicle vlocity indicator for use with a mechanism which is displaced a predetermined amount per unit distance of vehicle travel with respect to ground, wherein said vehicle is an aircraft and its destination is a DME ground beacon comprising:
a source of light;
a plurality of light responsive means adapted to receive light from said source;
means coupled to said mechanism for directing the light from said light source to different ones of said light responsive means at predetermined points of displacement of said mechanism;
timing means for providing an output signal which is a function of the length of time that said timing means is on;
means coupled to one of said light responsive means for turning on said timing means responsive to a first one of said signals;
means coupled to another of said light responsive means for turning off said timing means responsive to a second one of said signals, the period of time during which said timer was on being a function of the velocity of said vehicle with respect to ground;

a vehicle velocity indicator coupled to said timing means; and means for disabling said vehicle velocity indicator when said vehicle is within a predetermined distance from said ground beacon, the last velocity indication being maintained during the period of time that said vehicle is within said predetermined distance to said ground beacon.

References Cited

UNITED STATES PATENTS

| | | | |
|---|---|---|---|
| 2,646,924 | 7/1953 | Schuck | 343—6.5 |
| 2,654,884 | 10/1953 | Palmer | 343—6 |
| 2,743,417 | 4/1956 | Hollmann | 324—68 |

FOREIGN PATENTS 919,421  2/1963  Great Britain.

OTHER REFERENCES

Shulman, J. M., Accurate Tachometry Methods with Electronic Counters, Communications and Electronics, pp. 452–455, November 1954.

RUDOLPH V. ROLINEC, Primary Examiner

M. J. LYNCH, Assistant Examiner

U.S. Cl. X.R.

343—9